United States Patent [19]

Tooke-Kirby et al.

[11] 4,380,599

[45] Apr. 19, 1983

[54] ORGANOTIN POLYMERS METHOD OF MAKING THEM AND PAINTS CONTAINING THEM

[75] Inventors: David H. Tooke-Kirby, Hornchurch; Richard E. Perry, Billericay; Kenneth H. Arbuckle, Chigwell, all of England

[73] Assignee: Berger, Jenson and Nicholson Ltd., London, England

[21] Appl. No.: 304,811

[22] Filed: Sep. 22, 1981

[30] Foreign Application Priority Data

Feb. 6, 1981 [GB] United Kingdom ................ 8103674

[51] Int. Cl.$^3$ .............................................. C08C 19/00
[52] U.S. Cl. ..................................... 525/370; 525/51; 525/386
[58] Field of Search .......................... 525/370, 51, 386

[56] References Cited

U.S. PATENT DOCUMENTS 3,201,376  8/1965  Osborn et al. ...................... 525/370
4,262,097  4/1981  Dawans et al. ..................... 525/370

FOREIGN PATENT DOCUMENTS 2068975  8/1981  United Kingdom .

Primary Examiner—Melvyn I. Marquis
Attorney, Agent, or Firm—Wenderoth, Lind & Ponack

[57] ABSTRACT

Organotin polymers for use in marine anti-fouling paints contain pendent groups having the general formula —O.CO.R$^1$CO.OSnR$_3$ where R is $C_1$ to $C_{10}$ alkyl, aryl, aralkyl or alkaryl, and R$^1$ is a saturated or unsaturated aliphatic or aromatic $C_2$ to $C_{10}$ group. The polymer may be made by reacting a hydroxyl-containing polymer, e.g. styrene/allyl alcohol, with a carboxylic acid anhydride under ring-opening conditions and reacting the resulting carboxyl-containing polymer with an organotin compound.

10 Claims, No Drawings

ORGANOTIN POLYMERS METHOD OF MAKING THEM AND PAINTS CONTAINING THEM

This invention relates to organotin polymers such as are useful in antifouling paints.

The use of trialkyl and triaryl organotin compounds to inhibit the attachment and growth of barnacles, algae and other organisms responsible for fouling is well known. Tributyltin and triphenyltin compounds have gained particular importance as biocides in antifouling paints. The use of organotin compounds purely as additives in paint formulations has certain disadvantages, such as their high mammalian toxicity, non-durability and unpleasant odour. The advent of organotin polymers to overcome these disadvantages and their subsequent use in antifouling paints has been well known for many years.

Organotin groups in polymers are not significantly toxic to the organisms which it is desired to kill. The success of such paints is due to the fact that the polymers undergo a slow hydrolysis, providing a controlled release of organotin groups which is maintained over many months or years. Organotin groups have been incorporated in polymers by means of ether and ester linkages. Both have disadvantages.

For example, bis-tri-n-butyltin oxide or triphenyl tin hydroxide may be reacted with a hydroxyl-containing polymer to give a polymer containing organotin groups joined to the backbone by means of ether linkages. This type of polymer has poor antifouling properties as the organotin ether linkage is not readily hydrolysable in a marine environment, so that the release of biocide is inadequate to prevent fouling.

Alternatively, bis-tri-n-butyltin oxide or triphenyltin hydroxide may be reacted with a carboxyl-containing polymer to give a polymer containing organotin groups joined to the backbone by means of ester linkages. This process has the disadvantage that the starting carboxyl-containing polymers are not very soluble in inert solvents which are required for the reaction between carboxyl group and organotin compounds.

The present invention provides an organotin polymer, which may be prepared from a hydroxyl containing polymer, and which contains organotin groups joined to the polymer backbone by ester linkages. The polymer can be made by modification of existing commercially available polymers which are already in use, e.g. for marine paints. The resulting organotin-containing polymers are readily hydrolysed in a marine environment, and therefore have good antifouling properties.

The invention provides an organotin polymer, derived from a hydroxyl-containing polymer having a hydroxyl value of from 50 to 400, containing pendent groups having the following general formula:

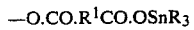

where R is $C_1$ to $C_{10}$ alkyl, aryl, aralkyl or alkaryl, and
$R^1$ is a saturated or unsaturated aliphatic or aromatic $C_2$ to $C_{10}$ group.

These polymers may be formed by reacting a hydroxyl-containing polymer with a carboxylic acid anhydride $(R^1(CO)_2O)$ under conditions to open the ring and react one, but not both, of the resulting carboxyl groups with a hydroxyl group of the polymer, and then reacting the resulting carboxyl-containing polymer with an organotin compound such as an organotin oxide or hydroxide.

The hydroxyl-containing polymer has a hydroxyl value of from 50 to 400, preferably from 125 to 300. Suitable are polymers of allyl alcohol with styrene, particularly in mole ratios from 1:1 to 1:10. The styrene gives a harder polymer, and improves the film-forming, drying and film properties of the resulting paint. In place of styrene may be used other vinyl aromatic monomers such as vinyl toluene or alphamethyl styrene or acrylic monomers such as methyl methacrylate. In place of allyl alcohol may be used a hydroxy acrylate ester such as the 2-hydroxy ethyl or 2-hydroxy propyl ester of acrylic or methacrylic acid.

The nature of the polymer is chosen to have a desired range of properties for the resulting product, e.g. a marine paint. The physical properties of the polymer can be modified by reaction with a fatty acid, such as soya oil fatty acid or tall oil fatty acid, prior to reaction with the anhydride. The fatty acid acts as an internal plasticizer. Alternatively a plasticising monomer, e.g. butyl acrylate, can be copolymerised into the backbone. The molecular weight of the polymer is chosen to give a convenient viscosity for the intended end use, e.g. in a marine paint.

As the carboxylic acid anhydride, there may be used any cyclic anhydride such as for example, maleic anhydride, succinic anhydride, phthalic anhydride, trimellitic anhydride, the reaction product of maleic anhydride with butadiene, or the reaction product of maleic anhydride with cyclopentadiene. This is reacted with the hydroxyl-containing polymer under conditions to effect ring opening of the anhydride but not to cause cross-linking of the polymer. Ordinary reaction conditions for this conventional reaction may be used, suitable temperatures being from 130° C. to 155° C. The ring opening reaction may be monitored by measurement of acid value by aqueous titration.

Provided that it is capable of reacting with carboxyl groups, the nature of the organotin compound is not critical. It may for example be an oxide or hydroxide. The three organic groups attached to the (or each) tin atom may be the same or different. Tributyltin and triphenyltin compounds are most generally used. Preferred reaction temperatures are in the range 80°–170° C. The reaction may conveniently be performed under reflux in an inert organic solvent such as xylol which boils at a suitable temperature. Progress of the reaction may be monitored by collecting the evolved water.

The resulting polymer preferably contains 10 to 25% by weight, particularly 15 to 20% by weight of tin. When the proportion of tin is below 10% by weight, the antifouling properties of the polymer may not be sufficient. It is not easily possible to incorporate more than about 25% by weight of tin by means of ester linkages into an organic polymer. Under some circumstances it may be preferable to leave a proportion of hydroxyl or carboxyl groups in the polymer to improve its leaching and/or hydrolysis properties. More usually, however, equivalent amounts of the reactants are used so that one organotin group is introduced for each hydroxyl group in the starting polymer. These organotin polymers may also be useful as antifungal preservatives for timber.

The organotin polymers of this invention may in principle be formed by other methods, though the method described above is preferred:

(a) The carboxylic acid anhydride may be reacted with a hydroxyl-containing monomer, and the resulting monomer homopolymerised or copolymerised. The organotin compound is then reacted with pendent carboxyl groups in the resulting polymer.

(b) The organotin compound is reacted with the carboxylic acid anhydride, and the resulting tin-containing carboxylic acid reacted with a hydroxyl-containing polymer.

The following examples illustrate the invention.

EXAMPLE 1

480 g (1.6 hydroxyl equivalents) of a styrene/allyl alcohol copolymer and 50 g of toluol were placed in a two liter flask equipped with condenser, water separator, stirrer, and temperature control and heated at reflux until the polymer had dissolved. The mixture was cooled to 110° C. 156.8 g (1.6 anhydride equivalents) of maleic anhydride was then added and the temperature raised to 135°-140° C. The flask contents were heated at reflux for one hour to give a final acid value of 143. 400 g of xylol was then added and the temperature cooled to below 100° C. 476.8 g (1.6 organotin equivalents) of bis tri n-butyl tin oxide was then added and the temperature raised to reflux (145°-150° C.) and held for two hours. Water of reaction was removed azeotropically, the final amount collected was 15 mls. The resin was then adjusted to 65% solids with xylol to give a viscosity of 25 poise at 25° C. The theoretical tin content of the resin was 17.1%.

EXAMPLE 2

480 g (2.2 hydroxyl equivalents) of a styrene/allyl alcohol copolymer and 50 g of toluol were placed in a two liter flask equipped with stirrer, water separator, condenser and temperature control, and heated until reflux to remove any water. The temperature was then cooled to 110° C. and 156.8 g of maleic anhydride added. The temperature was then raised to 135°-140° C. and held for one hour to give a final acid value of 140. 400 g of xylol was added and the temperature cooled to below 100° C. 476.8 g of bis tri n-butyl tin oxide was then added and the temperature raised to reflux and held for two hours. Water of reaction was removed azeotropically, the final amount collected was 16 mls. The resin was then adjusted to 65% solids with xylol to give a viscosity of 30 poise at 25° C. The theoretical tin content on solids was 17.1%.

EXAMPLE 3

442 g (2.0 hydroxyl equivalents) of a styrene/allyl alcohol copolymer, 76 g (0.3 carboxyl equivalents) of tall oil fatty acid and 75 g of xylol were added to a two liter flask equipped with stirrer, water separator, condenser and temperature control. The contents were heated at 220° C. for three hours until an acid value of less than 4 was obtained. The flask was then cooled to below 100° C. when 50 g of toluol and 169.4 g (1.7 anhydride equivalents) of maleic anhydride was added. The temperature was then raised to 135° C. and held for one hour to give an acid value of 150. The temperature was then cooled to below 100° C. by addition of 400 g of xylol. 515 g (1.7 organotin equivalents) of bis tri n-butyl tin oxide was then added and the temperature raised to reflux and held for two hours. 16 mls of water were collected. The resin was finally adjusted to 65% solids with xylol to give a viscosity of 16 poise at 25° C. The theoretical tin content was 17.4%.

EXAMPLE 4

442 g (2.0 hydroxyl equivalents) of a styrene/allyl alcohol copolymer and 100 g of xylol were placed in a two liter flask equipped with stirrer, condenser, water separator and temperature control. The contents were heated to reflux to remove any water and dissolve the polymer. The flask was then cooled to 100° C. and 262 g (1.8 anhydride equivalents) of phthalic anhydride was then added and the temperature raised to 155° C. and held for one hour to give an acid value of 152. 400 g of xylol was then added and the temperature cooled to below 100° C. 527 g (1.8 organotin equivalents) of bis tri n-butyl tin oxide was then added and the temperature raised to reflux and held for two hours. 15 mls of water were collected. The resin was then adjusted to 65% solids with xylol to give a final viscosity of 3 poise at 25° C. The theoretical tin content on solids was 17.3%.

EXAMPLE 5

220 g (1.0 hydroxyl equivalents) of a styrene/allyl alcohol copolymer and 50 g of xylol were placed in a one liter flask equipped with stirrer, condenser, water separator and temperature control. The contents were heated to reflux removing any water (approx. 1.8 mls). The flask was then cooled to 100° C. and 148 g (1.0 anhydride equivalents) of phthalic anhydride was then added and the temperature raised to 155° C. and held for two hours to give a final acid value of 161. 200 g of xylol was added and the flask cooled to below 100° C. 18.3 g (0.05 organotin equivalents) or triphenyl tin hydroxide and 283.1 g (0.95 organotin equivalents) of bis tri n-butyl oxide were then added and the temperature raised to reflux and held for two hours. 8 mls of water were collected. The resin was then adjusted to 65% solids with xylol to give a viscosity of 3.0 poise at 25° C. and a theoretical tin content on solids of 18.0%.

EXAMPLE 6

350 parts of a copolymer of hydroxy-ethyl methacrylate, butyl acrylate and methyl methacrylate (hydroxyl value-145), at 43% solids in methyl isobutyl ketone was reacted with 37.8 parts of succinic anhydride for two hours at 120°-140° C. The temperature was reduced to 80° C. and 100 parts of toluol and 112.7 parts of bis tri n-butyl tin oxide added. The esterification reaction was carried out under azeotropic conditions for four hours, removing the water of reaction. The final resin was adjusted to 50% non-volatile matter with toluene to give a viscosity of 7 poise at 25° C. The polymer solids contained 15% by weight of tin.

EXAMPLE 7

The polymers of each Example 1 to 5 were diluted with xylene and applied to both sides of Bakelite panels to give a 50 micron dry film thickness on each side. The panels were immersed in sea water, together with an uncoated panel. After 54 days, the panels were inspected for fouling with the following results:

| Resin of Example | Extent of Fouling |
| --- | --- |
| 1 | Very light |
| 2 | Clean |
| 3 | Clean |
| 4 | Clean |
| 5 | Clean |

| Resin of Example | Extent of Fouling |
| --- | --- |
| Blank | Very heavy |

This invention also includes marine anti-fouling paints comprising film-forming resin, pigment and organic solvent, wherein the film-forming resin comprises a polymer as herein described in an amount of from 2% to 15% preferably 3% to 10%, by weight of tin.

Examples 8 to 12 show paint formulations made up using the polymers of Example 1 to 6. All the paint formulations were tested and shown to have interesting anti-fouling properties. All quantities are expressed as parts by weight.

EXAMPLE 8

| 1:1 blend of polymers of Examples 1 and 2 | 121.8 |
| --- | --- |
| Copper thiocyanate | 44.0 |
| Titanium dioxide | 4.9 |
| Thickener | 1.5 |
| Propylene carbonate | 0.7 |
| Plasticiser | 8.0 |
| Tributyl tin oxide | 1.0 |
| Xylene | 40.0 |
| (Pigment volume concentration) | 20.0%) |

EXAMPLE 9

| Polymer of Example 3 | 119.80 |
| --- | --- |
| Zinc oxide | 198.40 |
| Thickener | 1.50 |
| Propylene carbonate | 0.70 |
| Xylene | 70.00 |
| (Pigment volume concentration | 35%) |

EXAMPLE 10

| Polymer of Example 4 | 123.0 |
| --- | --- |
| Cuprous oxide | 40.3 |
| Micronised barytes | 274.8 |
| Propylene carbonate | 0.7 |
| Plasticiser | 8.0 |
| Xylene | 30.0 |
| (Pigment volume concentration | 50%) |

EXAMPLE 11

| Polymer of Example 5 | 121.8 |
| --- | --- |
| Zinc oxide | 211.4 |
| Thickener | 1.5 |
| Propylene carbonate | 0.7 |
| Plasticiser | 8.0 |
| Xylene | 90.0 |
| (Pigment volume concentration) | 35%) |

EXAMPLE 12

| Polymer of Example 6 | 45.0 |
| --- | --- |
| Zinc oxide | 40.1 |
| Colloidal silica | 1.0 |
| Tributyltin fluoride | 4.1 |

We claim:

1. An organotin polymer suitable for use in marine anti-fouling paints, derived from a hydroxyl-containing polymer having a hydroxyl value of from 50 to 400, containing pendent groups having the following general formula:

$$-O.CO.R^1CO.OSnR_3$$

where R is $C_1$ to $C_{10}$ alkyl, aryl, aralkyl or alkaryl and $R^1$ is a saturated or unsaturated aliphatic or aromatic $C_2$ to $C_{10}$ group.

2. A polymer as claimed in claim 1, derived from a copolymer of styrene with allyl alcohol.

3. A polymer as claimed in claim 2, wherein the mole ratio of allyl alcohol to styrene in the copolymer is from 1:1 to 1:10.

4. A polymer as claimed in any one of claims 1 to 3 derived from a hydroxyl-containing polymer which has been modified by reaction with a fatty acid selected from the group consisting of soya oil fatty acids and tall oil fatty acids.

5. A polymer as claimed in any one of claims 1 to 3 and containing 10% to 25% by weight of tin.

6. A method of making the organotin polymer claimed in claim 1, which method comprises reacting a hydroxyl-containing polymer with carboxylic acid anhydride $(R^1(CO)_2O)$ under conditions to open the ring and react one, but not both of the resulting carboxyl groups with a hydroxyl group of the polymer, and then reacting the resulting carboxyl-containing polymer with an organotin compound.

7. A method as claimed in claim 6, wherein the carboxylic acid anhydride is maleic anhydride, succinic anhydride, phthalic anhydride, trimellitic anhydride, the reaction product of maleic anhydride with butadiene, or the reaction product of maleic anhydride with cyclopentadiene.

8. A method as claimed in claim 6, wherein the organotin compound is an organotin oxide or hydroxide.

9. A marine anti-fouling paint comprising film-forming resin, pigment and organic solvent, wherein the film-forming resin comprises the polymer claimed in claim 1 in an amount to provide from 2% to 15% by weight of tin.

10. A marine anti-fouling paint comprising film-forming resin including an organotin polymer containing 10% to 25% by weight of tin in an amount to provide from 2% to 15%, by weight on the weight of the paint, of tin, wherein the organotin polymer is derived from a hydroxyl-containing polymer having a hydroxyl value of from 50 to 400 and contains pendent groups having the following general formula:

$$-O.CO.R^1CO.OSnR_3$$

where R is $C_1$ to $C_{10}$ alkyl, aryl, aralkyl or alkaryl, and $R^1$ is a saturated or unsaturated aliphatic or aromatic $C_2$ to $C_{10}$ group.

* * * * *